(12) United States Patent
Yoshida

(10) Patent No.: US 10,882,151 B2
(45) Date of Patent: Jan. 5, 2021

(54) AUTOMATIC PALLET CHANGER IN MACHINE TOOL

(71) Applicant: OKUMA CORPORATION, Niwa-gun (JP)

(72) Inventor: Makoto Yoshida, Niwa-gun (JP)

(73) Assignee: OKUMA CORPORATION, Niwa-gun (JP)

( * ) Notice: Subject to any disclaimer, the term of this patent is extended or adjusted under 35 U.S.C. 154(b) by 0 days.

(21) Appl. No.: 16/779,690

(22) Filed: Feb. 3, 2020

(65) Prior Publication Data

US 2020/0262016 A1  Aug. 20, 2020

(30) Foreign Application Priority Data

Feb. 14, 2019  (JP) .................................. 2019-024120

(51) Int. Cl.
*B23Q 1/66* (2006.01)
*B23Q 7/14* (2006.01)

(52) U.S. Cl.
CPC ............. *B23Q 7/1431* (2013.01); *B23Q 1/66* (2013.01); *B23Q 2707/00* (2013.01); *Y10T 29/5196* (2015.01)

(58) Field of Classification Search
CPC ................................ B23Q 1/66; B23Q 7/1431
USPC ..................... 198/346.1; 414/222.07, 223.01
See application file for complete search history.

(56) References Cited

U.S. PATENT DOCUMENTS

| 4,637,108 A * | 1/1987 | Murata ................. | B23Q 7/1431 198/346.1 |
| 4,747,193 A * | 5/1988 | Hashidate ............ | B23Q 7/1442 198/346.1 |
| 4,951,601 A * | 8/1990 | Maydan ............ | H01L 21/67167 118/715 |
| 7,433,756 B2 * | 10/2008 | Rice .................. | H01L 21/67253 700/213 |
| 7,621,031 B2 * | 11/2009 | Kawai .................. | B23Q 1/4852 198/346.1 |
| 8,240,454 B2 * | 8/2012 | Kikkawa .............. | B23Q 7/1431 198/347.3 |
| 8,562,274 B2 * | 10/2013 | Murray .................. | B65B 39/02 414/222.02 |
| 8,656,576 B2 * | 2/2014 | Hobel .................... | B23Q 3/069 29/563 |

(Continued)

FOREIGN PATENT DOCUMENTS

JP           09-309038 A    12/1997

*Primary Examiner* — Douglas A Hess
(74) *Attorney, Agent, or Firm* — Locke Lord LLP

(57) ABSTRACT

An automatic pallet changer 2 includes: a pallet housing unit 11 having a plurality of pallet placement portions; and a pallet transfer unit 12 configured to transfer a pallet P that is at a required pallet placement portion and has an unmachined workpiece W attached thereto to a standby station S2 and configured to transfer a pallet P that is at the standby station S2 and has a machined workpiece W attached thereto to a required pallet placement portion. The pallet housing unit 11 includes: main housing portions 13a to 13f that have a plurality of rows of pallet placement portions, each having a plurality of stages, and are disposed to face the machine tool body 1; and three rows of secondary housing portions 14 that have one stage of pallet placement portions and are disposed above the machine tool body 1.

1 Claim, 2 Drawing Sheets

(56) References Cited

U.S. PATENT DOCUMENTS

| | | | | |
|---|---|---|---|---|
| 8,978,218 B2* | 3/2015 | Moder | ................... | B23Q 7/02 29/33 P |
| 9,156,509 B2* | 10/2015 | Shimizu | ................ | B62D 65/06 |
| 10,229,847 B2* | 3/2019 | Wakabayashi | .... | H01L 21/67769 |
| 10,529,607 B2* | 1/2020 | Ito | ................... | H01L 21/67715 |

* cited by examiner

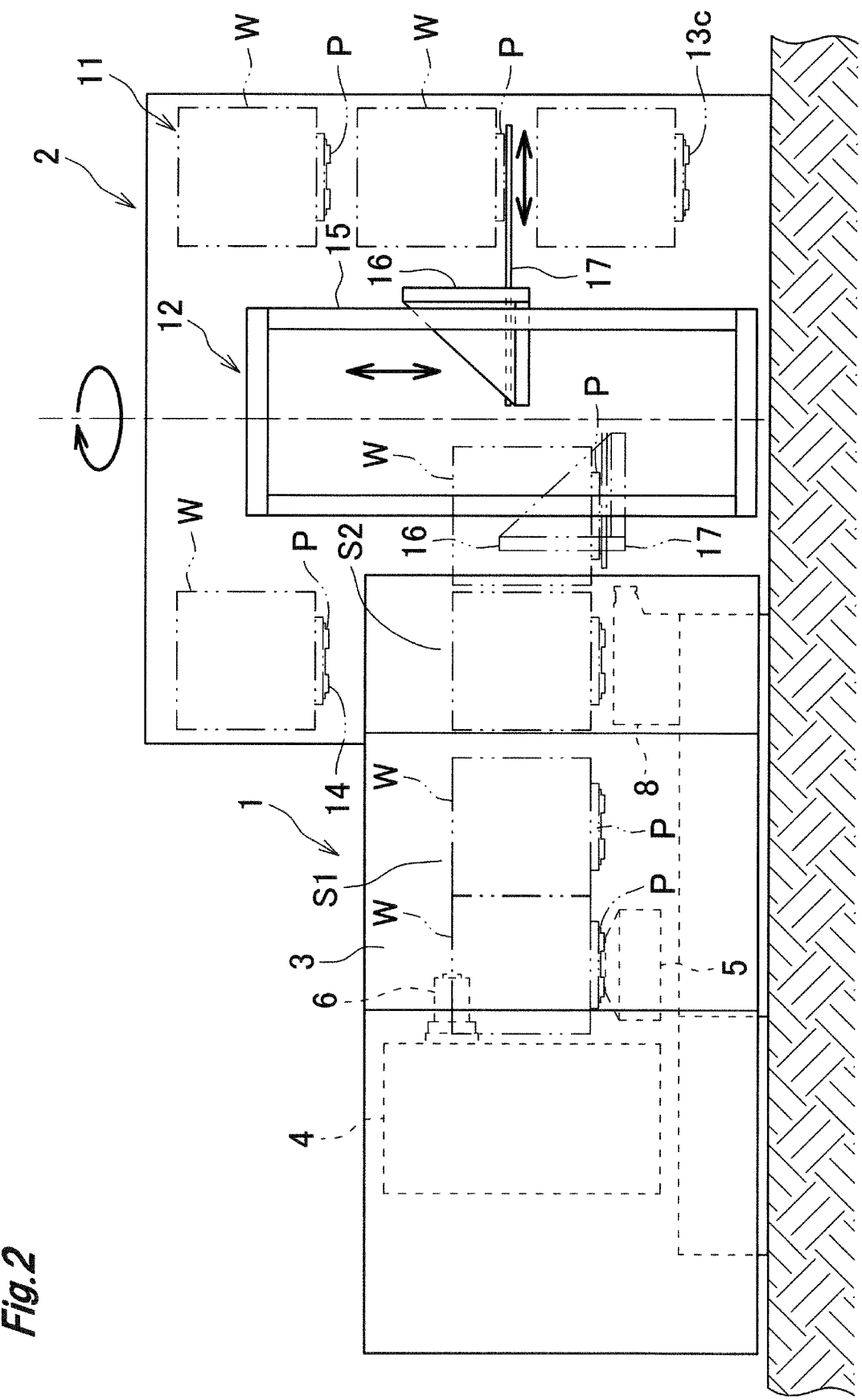

AUTOMATIC PALLET CHANGER IN MACHINE TOOL

TECHNICAL FIELD

The present invention relates to an automatic pallet changer in a machine tool, for example, such as a machining center.

BACKGROUND ART

In a known machine tool such as a machining center, pallets each having a workpiece attached thereto to feed the workpieces are used, and an automatic pallet changer (APC) that automatically exchanges the pallets having the workpieces attached thereto is used.

As an automatic pallet changer, not only one that is configured to house pallets in a planar manner but also one that is configured to be capable of housing pallets at multiple stages, which is called a tower APC, is used (Patent Literature 1).

CITATION LIST

Patent Literature

Patent Literature 1: Japanese Unexamined Patent Application Publication JP-A-H9-309038

SUMMARY OF INVENTION

Technical Problem

The tower APC aims at improving the efficiency of machining operation performed by a machine tool, which is achieved by housing many pallets. Thus, the APC of this type preferably houses more pallets. However, in order to increase the number of pallets, there arises a need to increase the installation area of the tower APC, and the like, which are demerits of the APC. Therefore, housing more pallets while decreasing the demerits is required.

An object of the present invention is to provide an automatic pallet changer in a machine tool, which is capable of housing more pallets even if an installation area thereof is equal to that of a conventional automatic pallet changer.

Solution to Problem

The automatic pallet changer in a machine tool, in accordance with the present invention is an automatic pallet changer in a machine tool, as follows. That is, the automatic pallet changer is installed in a vicinity of a machine tool body including: a machining station at which a workpiece attached to a pallet is machined; a standby station at which a pallet having a machined or un-machined workpiece attached thereto is caused to be put on standby temporarily; and a pallet delivery device configured to deliver and receive pallets having workpieces attached thereto between the machining station and the standby station, and the automatic pallet changer is configured to house a plurality of pallets to which workpieces are to be attached and is configured to carry-in and carry-out required pallets to or from the machine tool body, respectively. The automatic pallet changer includes: a pallet housing unit having a plurality of pallet placement portions; and a pallet transfer unit configured to transfer a pallet that is at a required pallet placement portion and that has an un-machined workpiece attached thereto to the standby station and configured to transfer a pallet that is at the standby station and that has a machined workpiece attached thereto to a required pallet placement portion. The pallet housing unit includes: main housing portions that have a plurality of rows of pallet placement portions each having a plurality of stages, and that are disposed so as to face the machine tool body; and at least one row of secondary housing portion that has at least one stage of pallet placement portion and is disposed above the machine tool body.

The conventional tower automatic pallet changer includes only a tower housing unit, which has a plurality of rows of pallet placement portions each having a plurality of stages, and is disposed to face the machine tool body. In contrast, the automatic pallet changer of the present invention further includes a secondary housing portion that is disposed above the machine tool body in addition to the tower housing unit as the main housing portion. Therefore, the automatic pallet changer of the present invention is capable of housing more pallets as compared to the conventional tower automatic pallet changer, without any increase in footprint.

The main housing portion may have the same configuration as that of the conventional one. For example, a plurality of stages of the pallet placement portions may be arranged in a plurality of rows so as to form a C-shape as seen from the top, or a plurality of stages of the pallet placement portions may be arranged in a plurality of rows to form a straight line as seen from the top. In addition, the pallet transfer unit may also be configured to be the same as the conventional one. For example, one including a pallet support arm capable of ascending/descending and turning may be used, and one including a stacker crane may be used.

The pallet placement portion of the secondary housing portion may be configured as only one-row arrangement, but is preferably configured as two-row arrangement or more.

The height of the pallet placement portion of the secondary housing portion is preferably the same as that of the pallet placement portions at the uppermost stage of the main housing portions. This configuration enables the carrying-out and the carrying-in of the pallet on the pallet placement portion of the secondary housing portion to be performed by the same steps as in the carrying-out and the carrying-in of the pallet on the pallet placement portions at the uppermost stage of the main housing portions (for example, only the turning angle of the pallet support arm is different).

Advantageous Effects of Invention

With an automatic pallet changer in a machine tool in accordance with the present invention, it is possible to house an increased number of pallets as compared to the conventional tower automatic pallet changer, without any increase in footprint. This is because the automatic pallet changer of the present invention is configured to additionally have the secondary housing portion disposed above the machine tool body, in addition to the conventional tower automatic pallet changer.

BRIEF DESCRIPTION OF DRAWINGS

FIG. 2 is an elevational view showing the automatic pallet changer in a machine tool, in accordance with the present invention.

DESCRIPTION OF EMBODIMENTS

Figure 1:
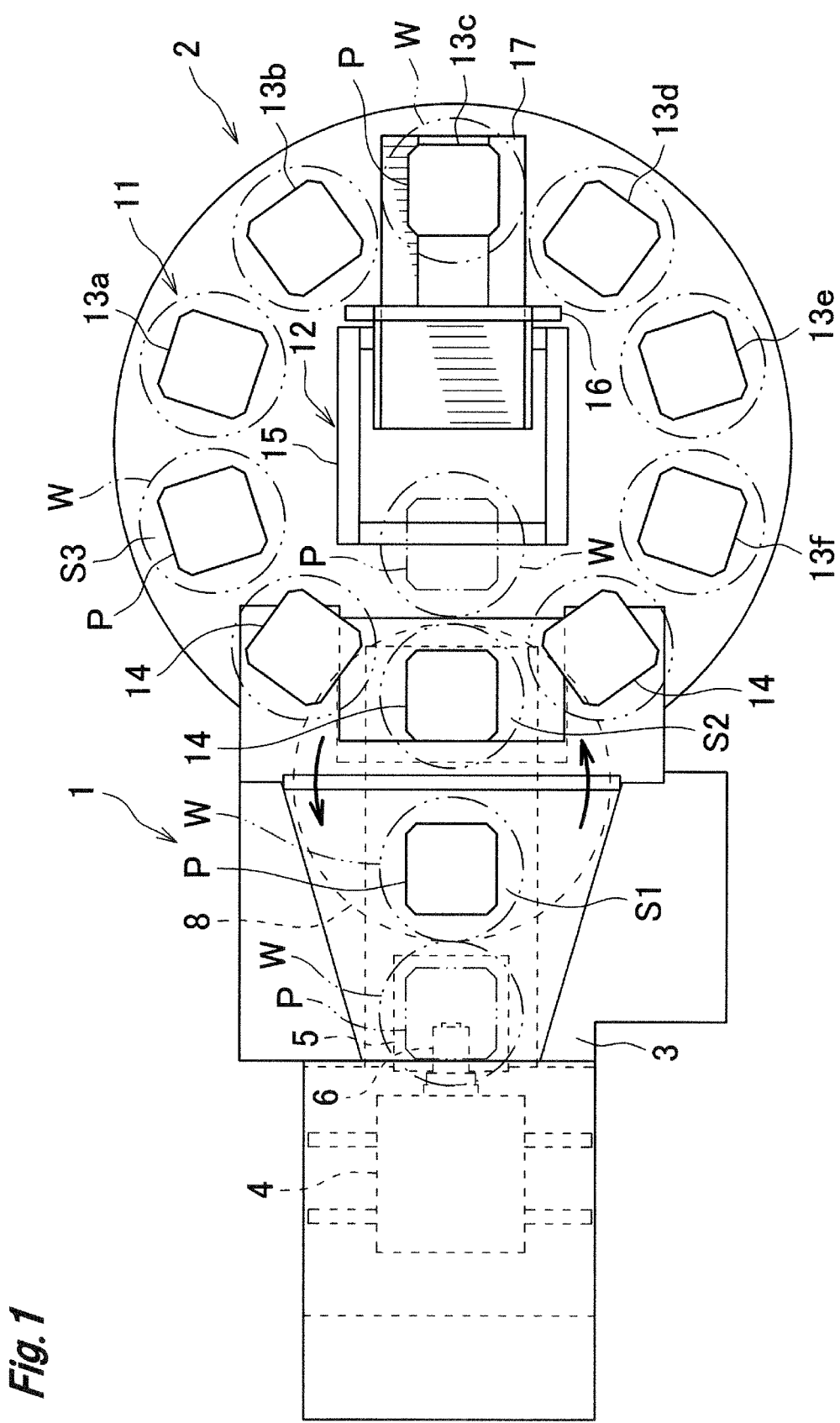
FIG. 1 is a plan view showing an automatic pallet changer in a machine tool, in accordance with the present invention.

An automatic pallet changer in accordance with an embodiment of the present invention will be described below in detail with reference to the drawings. In the following description, the terms "front" and "rear" refer, respectively, to the right and left sides of the drawings.

FIG. 1 and FIG. 2 show a machine tool body (1) and an automatic pallet changer (2) installed on the front side of the machine tool body (1).

The machine tool body (1) is a horizontal machining center configured to perform machining of a workpiece (W) attached to a pallet (P). The automatic pallet changer (2) is a tower automatic pallet changer (tower APC) configured to be capable of placing a plurality of pallets (P), each having a workpiece (W) attached thereto, at vertically different stages.

The machine tool body (1) includes a column (4) disposed in a machining chamber (3), a table (5) that is movable frontward and rearward relative to the column (4), a spindle head (6) supported by the column (4) in a vertically movable manner, a spindle attached to the spindle head (6), and a swivel-type pallet delivery device (8) configured to deliver and receive pallets (P).

The machine tool body (1) has a machining station (S1) that faces the spindle head (6) from the front side, and a standby station (S2) that faces the machining station (S1) from the front side and faces the automatic pallet changer (2) from the rear side. The workpiece (W) attached to the pallet (P) is placed from the machining station (S1) to the table (5) and then is machined with a tool attached to the spindle.

A pallet (P) at the machining station (S1) and a pallet (P) at the standby station (S2) are transferred by the swivel-type pallet delivery device (8) which is turned by 180 degrees. This results in transfer of an un-machined workpiece (W) at the standby station (S2) to the machining station (S1) and transfer of a machined workpiece (W) at the machining station (S1) to the standby station (S2).

The automatic pallet changer (2) includes a pallet housing unit (11) configured to be capable of housing a plurality of pallets (P), and a pallet transfer unit (12) configured to transfer pallets (P), each having a workpiece (W) attached thereto, from the pallet housing unit (11) to the machine tool body (1), or from the machine tool body (1) to the pallet housing unit (11).

The pallet housing unit (11) includes main housing portions (13a) to (13f) and three rows of secondary housing portions (14). The main housing portions (13a) to (13f) have a plurality of rows (six rows in the drawings) of pallet placement portions (not shown), each having a plurality of stages (three stages in the drawings), and are disposed so as to face the machine tool body (1) from the front side. The secondary housing portions (14) have one stage of pallet placement portions (not shown) and are disposed above the machine tool body (1).

As shown in FIG. 2, the height of the pallet placement portion of the secondary housing portion (14) is the same as that of the pallet placement portion at the uppermost stage of the main housing portion (13).

The pallet housing unit (11) is provided with a set-up station (S3) configured to perform a set-up operation of a workpiece (W) onto a pallet (P), which is performed together with an external device.

The plurality of rows of the main housing portions (13a) to (13f) are arranged to form a C-shape as seen from the top. The three rows of the secondary housing portions (14) in total are disposed so as to be positioned at an opening portion of the C-shape. The three rows of the secondary housing portions (14) are arranged, with the center one being at a position immediately above the standby station (S2) of the machine tool body (1) and the opposite ends being slightly displaced from the center one toward the both end sides, respectively, in the circumferential direction.

The automatic pallet changer (2) includes: a frame-like turning body (15) having the shape of a vertically elongated rectangle and capable of turning around a vertical axis; a vertically movable body (16) disposed on the turning body (15) in a vertically movable manner; and a pallet support arm (17) disposed on the vertically movable body (16) and capable of extension and retraction in a horizontal direction.

A pallet (P) that has an un-machined workpiece (W) attached thereto and is housed at a required position in the pallet housing unit (11) is transferred to the standby station (S2) by the automatic pallet changer (2), whereas a pallet (P) that has a machined workpiece (W) attached thereto and is at the standby station (S2) is housed at a required position in the pallet housing unit (11) by the automatic pallet changer (2).

The automatic pallet changer (2) transfers pallets (P) as follows.

In FIG. 2, a pallet support arm (17) indicated by a solid line is in an extended state and is inserted below a pallet (P). In this state, the vertically movable body (16) is moved slightly upward whereby the pallet (P) is supported by the pallet support arm (17). Thereafter, the pallet support arm (17) is in a retracted state. In this state, the movable body (15) is turned by 180 degrees and the vertically movable body (16) is moved downward, whereby the pallet (P) is moved to a position indicated by a two-dot chain line. This pallet (P) is at a height that is the same as that of a pallet (P) at the standby station (S2). By moving the vertically movable body (16) slightly downward, the pallet (P) is supported by the pallet delivery device (8) at the standby station (S2). In an inverse order thereto, a workpiece (W) that has been subjected to the machining is housed at a required position in the pallet housing unit (11) from the standby station (S2).

The turning angle of the turning body (15) and the vertical travel amount of the vertically movable body (16) may be set arbitrarily. Therefore, the transferring of a pallet (P) in the secondary housing portion (14) may also be performed in the same steps as those described above. Thus, the automatic pallet changer (2) is capable of carrying in and carrying out a pallet (P) at any position in the pallet housing unit (11), to and from the machine tool body (1), respectively.

Although not shown, the above-described automatic pallet changer in which the secondary housing portion is additionally disposed above the machine tool body, may be applicable to a system that is configured to carry in and carry out pallets using a stacker crane and that has pallets that are arranged linearly. In addition, the configuration to carry in and carry out the pallets is not limited to one including the dedicated pallet delivery device (8), and may be one that is configured to move the pallets from the machining station (S1) to the standby station (S2) using a feed and drive mechanism of the table (5).

The invention claimed is:

1. An automatic pallet changer in a machine tool, the automatic pallet changer
    that is installed in a vicinity of a machine tool body
        comprising: a machining station at which a workpiece attached to a pallet is machined; a standby station at which a pallet having a machined or un-machined workpiece attached thereto is caused to be put on standby temporarily; and a pallet delivery device configured to deliver and receive pallets having workpieces attached thereto between the machining station and the standby station, and that is configured to house a plurality of pallets to which workpieces are to be attached and is configured to carry-in and carry-out required pallets to or from the machine tool body, respectively, wherein the automatic pallet changer comprises: a pallet housing unit having a plurality of pallet placement portions; and a pallet transfer unit configured to transfer a pallet that is at a required pallet placement portion and that has an un-machined workpiece attached thereto to the standby station and configured to transfer a pallet that is at the standby station and that has a machined workpiece attached thereto to a required pallet placement portion, and the pallet housing unit comprises: main housing portions that have a plurality of rows of pallet placement portions each having a plurality of stages, and that are disposed so as to face the machine tool body; and at least one row of secondary housing portion that has at least one stage of pallet placement portion and is disposed above the machine tool body, wherein the number of the stages of the secondary housing portion is less than the number of the stages of the main housing portion.

\* \* \* \* \*